United States Patent
Emmons et al.

(10) Patent No.: US 10,775,547 B2
(45) Date of Patent: Sep. 15, 2020

(54) LIGHTGUIDE

(71) Applicant: 3M INNOVATIVE PROPERTIES COMPANY, St. Paul, MN (US)

(72) Inventors: Robert M. Emmons, St. Paul, MN (US); David A. Rosen, Maplewood, MN (US); Nicholas A. Johnson, Burnsville, MN (US); Gary T. Boyd, Woodbury, MN (US); Trevor W. Stolber, Stillwater, MN (US); Owen M. Anderson, Minneapolis, MN (US); Graham M. Clarke, Woodbury, MN (US); Sherie A. Kristie, Hudson, WI (US); Edward C. Roberts, Maplewood, MN (US); Kristy A. Gillette, Spring Valley, WI (US)

(73) Assignee: 3M Innovation Properties Company, St. Paul, MN (US)

( * ) Notice: Subject to any disclaimer, the term of this patent is extended or adjusted under 35 U.S.C. 154(b) by 0 days.

(21) Appl. No.: 16/497,012

(22) PCT Filed: Mar. 12, 2018

(86) PCT No.: PCT/IB2018/051629
§ 371 (c)(1),
(2) Date: Sep. 24, 2019

(87) PCT Pub. No.: WO2018/178790
PCT Pub. Date: Oct. 4, 2018

(65) Prior Publication Data
US 2020/0103578 A1    Apr. 2, 2020

Related U.S. Application Data

(60) Provisional application No. 62/479,842, filed on Mar. 31, 2017.

(51) Int. Cl.
*F21V 8/00* (2006.01)

(52) U.S. Cl.
CPC ......... *G02B 6/0038* (2013.01); *G02B 6/0036* (2013.01); *G02B 6/0065* (2013.01)

(58) Field of Classification Search
None
See application file for complete search history.

(56) References Cited

U.S. PATENT DOCUMENTS

| 5,995,690 A | 11/1999 | Kotz |
| 6,268,961 B1 | 7/2001 | Nevitt |

(Continued)

FOREIGN PATENT DOCUMENTS

| CN | 101329423 | 12/2008 |
| CN | 201159778 | 12/2008 |

(Continued)

OTHER PUBLICATIONS

International Search report for PCT International Application No. PCT/IB2018/051629 dated Jun. 27, 2018, 3 pages.

*Primary Examiner* — Elmito Breval
(74) *Attorney, Agent, or Firm* — Clifton F. Richardson

(57) ABSTRACT

A lightguide having opposing first and second major surfaces where the first major surface includes a plurality of extended features and a plurality of discrete features is described. The lightguide has a viewable area having a length at least 100 times a thickness of the lightguide. The extended features extend in a first in-plane direction across at least 90 percent of the length L of the viewable area. The discrete features are spaced apart along the length and width of the viewable area. The discrete features may be disposed in spaces between the extended features. The discrete features may have faces extending between and connecting adjacent extended features.

20 Claims, 8 Drawing Sheets

(56) References Cited

U.S. PATENT DOCUMENTS

| | | | |
|---|---|---|---|
| 6,322,236 | B1 | 11/2001 | Campbell |
| 8,075,174 | B2 * | 12/2011 | Tsai ................... G02B 6/0038 |
| | | | 362/339 |
| 8,834,001 | B2 | 9/2014 | Lin |
| 9,097,829 | B2 | 8/2015 | Park |
| 9,182,530 | B2 * | 11/2015 | Goto ................... G02B 6/0038 |
| 9,411,091 | B2 | 8/2016 | Pijlman |
| 2003/0157344 | A1 | 8/2003 | Shoup |
| 2004/0061944 | A1 | 4/2004 | Kashima |
| 2006/0141220 | A1 * | 6/2006 | Merrill ................... B29C 55/04 |
| | | | 428/156 |
| 2009/0086509 | A1 | 4/2009 | Omori et al. |
| 2010/0046200 | A1 * | 2/2010 | Kuo ................... G02B 5/0252 |
| | | | 362/97.1 |
| 2010/0079701 | A1 | 4/2010 | Murayama |
| 2011/0134623 | A1 | 6/2011 | Sherman |
| 2011/0234580 | A1 | 9/2011 | Wang |
| 2012/0275188 | A1 | 11/2012 | Kurimoto |
| 2013/0170250 | A1 | 7/2013 | Kikuchi et al. |
| 2013/0302594 | A1 | 11/2013 | Sugiyama |
| 2014/0049986 | A1 | 2/2014 | Nakai |
| 2016/0033707 | A1 | 2/2016 | Lee |

FOREIGN PATENT DOCUMENTS

| | | |
|---|---|---|
| JP | 2014-505990 | 3/2014 |
| JP | 2016-066578 | 4/2016 |
| KR | 10-20110039129 | 4/2011 |
| KR | 10-1608963 | 4/2016 |

* cited by examiner

LIGHTGUIDE

BACKGROUND

A lightguide can be used in a backlight of a display to receive light from a light source proximate an edge of the lightguide and direct at least a portion of the received light along an output direction of the display.

SUMMARY

In some aspects of the present description, a lightguide having opposing first and second major surfaces and a thickness t between the first and second major surfaces is provided. The first major surface includes a plurality of extended features and a plurality of discrete features. The plurality of extended features extend in a first in-plane direction across at least 90 percent of an entire length L of a viewable area of the lightguide, L being at least 100 times t, the extended features covering between 10 and 60 percent of the viewable area. The plurality of discrete features are disposed in spaces between the extended features, the discrete features spaced apart along the length L and along a width W of the viewable area of the lightguide.

In some aspects of the present description, a lightguide having opposing first and second major surfaces and a thickness t between the first and second major surfaces is provided. The first major surface includes a plurality of extended features and a plurality of discrete features. The plurality of extended features extend in a first in-plane direction across at least 90 percent of an entire length L of a viewable area of the lightguide, L being at least 100 times t. The plurality of discrete features are spaced apart along the length L and along a width W of the viewable area of lightguide. Each discrete feature in the plurality of discrete features comprises a first face extending between and connecting adjacent first and second extended features, and a second face adjacent the first face and extending between and connecting the first and second extended features, the first and second faces meeting at an edge of the discrete feature.

In some aspects of the present description, a lightguide having opposing first and second major surfaces and a thickness t between the first and second major surfaces is provided. The first major surface includes a plurality of extended features and a plurality of discrete features. The plurality of extended features extend in a first in-plane direction across at least 90 percent of an entire length L of a viewable area of the lightguide, L being at least 100 times t. The plurality of discrete features are spaced apart along the length L and along a width W of the viewable area of lightguide. A unitary polymeric film comprises the first and second major surfaces, the plurality of extended features, and the plurality of discrete features.

DETAILED DESCRIPTION

Figure 1A:
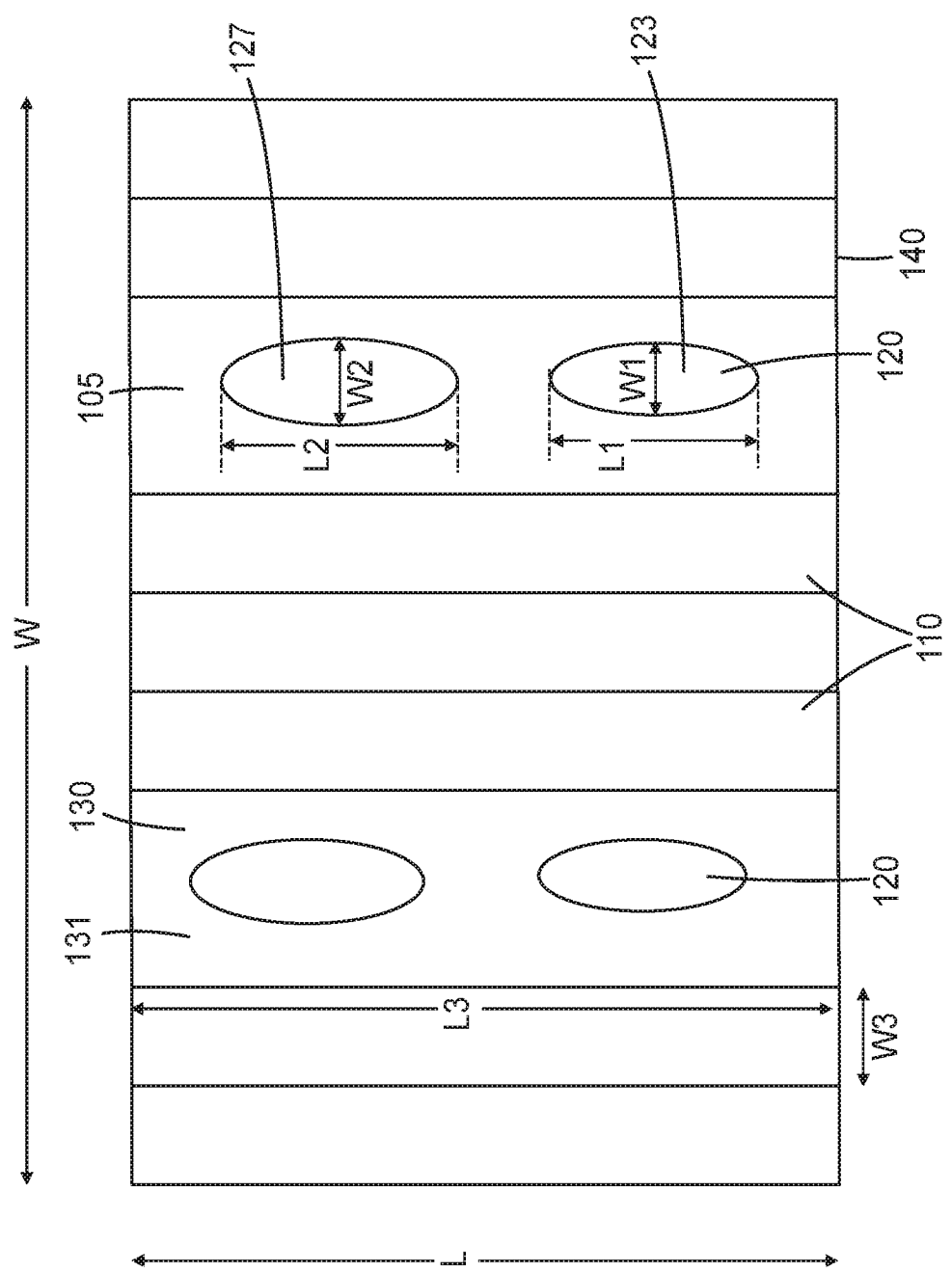
FIG. 1A is a schematic top view of a lightguide.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Conventional lightguides include lenticular elements on one side of the lightguide and light extraction features on the opposing side. According to the present description, it has been found that sufficiently thin lightguides that include both lenticular elements and light extraction features on a first major surface can achieve similar optical performance (e.g., uniformity, angular distribution of the light output, and light extraction efficiency) as conventional lightguides having lenticular elements on one side and light extractors on the opposite side. Such lightguides eliminate the need to align structures on opposing sides of the lightguide, for example, and can provide an additional unstructured surface that can be used to accept a functional coating (e.g., a hardcoat, an impact resistant coating, and/or an anti-wetout coating), for example.

In some embodiments, the lightguides of the present description include opposing first and second major surfaces, where the first major surface includes a plurality of extended features and a plurality of discrete features. The extended features may be lenticular lenses or prisms, for example, and the discrete features may be light extraction features. In some embodiments, the second major surface is unstructured. A major surface may be described as unstructured if it has no engineered features and if it has a roughness Ra less than 1 micrometer. The roughness parameter Ra is a standard metric for characterizing the roughness of a surface and is given by the arithmetic average of the absolute value of a surface displacement from the average surface height. In some embodiments, the roughness Ra of the second major surface is less than 500 nm, or less than 400 nm, or less than 200 nm, or less than 100 nm, or less than 50 nm. An unstructured surface having an Ra of no more than 100 nm is described herein as optically smooth.

In some embodiments, the lightguides of the present description are unitary. A unitary lightguide is integrally formed from a material as a monolithic structure and does not have layers with interfaces between layers, for example. In some embodiments, the lightguide is a unitary polymeric film. A unitary optical film lightguide can be made, for example, by passing a polymer melt between nip rollers where one of the rollers has the negative of a desired pattern for the first major surface of the lightguide, and cooling the polymer melt to form a unitary lightguide film. Alternatively, the desired pattern can be embossed onto the first major surface of a unitary film. As another example, the lightguide can be made by casting and curing an ultraviolet (UV) curable resin, such as a UV curable acrylate, onto a substrate. The substrate may be a release liner which is subsequently removed resulting in a unitary lightguide, or the substrate may be a film, such as a polycarbonate, acrylic or cyclo-olefin polymer (e.g., ZEONOR available from Zeon Corporation (Japan)) film, for example, which is retained with the lightguide which would then not be unitary in this case. Continuous cast and cure techniques are described in U.S. Pat. No. 5,995,690 (Kotz et al.), for example. The tool used (e.g., a structured nip roller or a cast and cure tool) can be made using a diamond turning tool, for example, to cut the desired pattern into the tool. Diamond turning techniques are described in U.S. Pat. No. 6,322,236 (Campbell et al.), for example.

The nip roller process or the cast and cure process, for example, can be carried out in a continuous roll to roll process. The lightguide film can then be die or laser cut, for example, into sizes desired for display applications, for example. After cutting the desired lightguide from the continuous film, the edges of the lightguide can be milled to smooth the edges.

Although the particular materials used for the lightguides may vary, it is generally preferred that the material be substantially transparent (e.g., a transmittance of at least 80 percent for visible light (400 nm-700 nm)) to ensure high optical transmission. Useful polymeric materials for this purpose are commercially available such as, for example, acrylics and polycarbonates having nominal indices of refraction of about 1.493 and 1.586, respectively (refractive index refers to the refractive index at a wavelength of 589 nm, unless indicated differently). Other useful polymers include polypropylene, polyurethane, polystyrene, polyvinyl chloride, and cyclic olefin copolymers, for example.

In some embodiments, the lightguide includes a coating (e.g., an impact resistant coating, a hardcoat, and/or an anti-wetout coating). The coating is typically a separate layer applied to the lightguide. The combination of a lightguide film and a coating would not be a unitary combination. However, the lightguide film comprising the opposing first and second major surface of the lightguide and the plurality of extended features and the plurality of discrete features may be a unitary polymeric film.

Figure 1B:
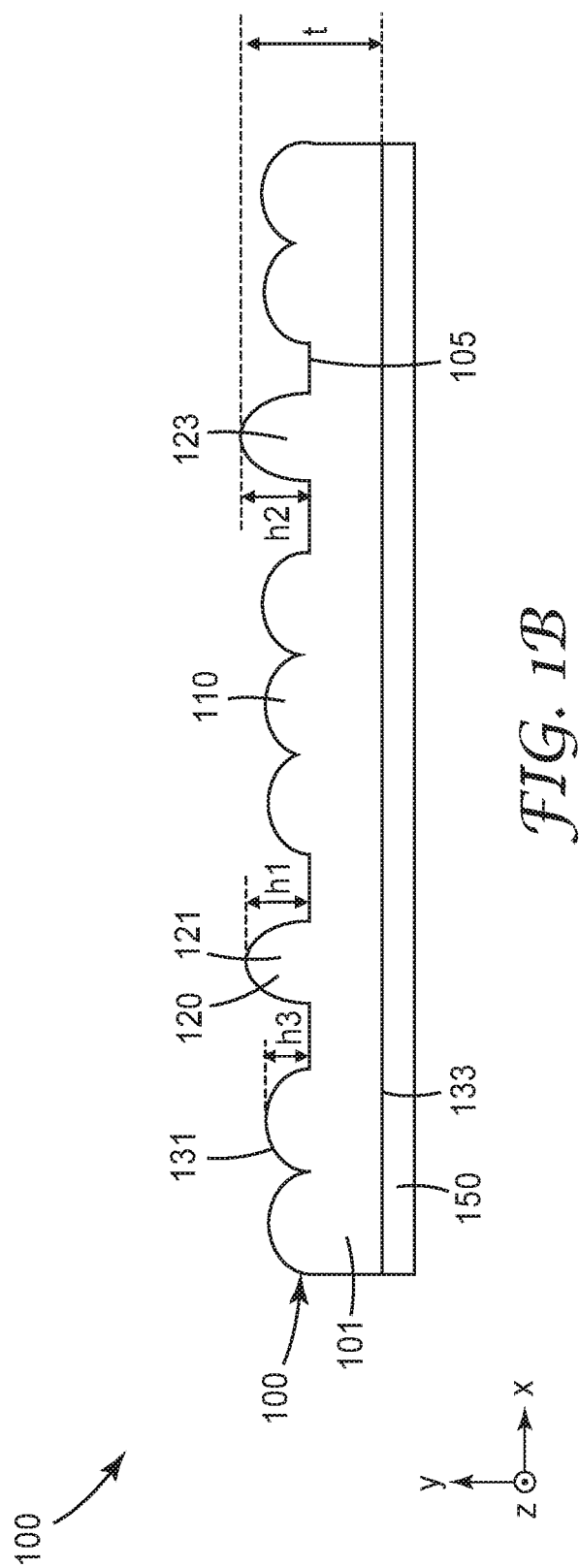
FIG. 1B is a schematic cross-sectional view of the lightguide of FIG. 1A.

FIGS. 1A and 1B are schematic top and cross-sectional views of a lightguide 100 having opposing first and second major surfaces 131 and 133, and a thickness t between the first and second major surfaces 131 and 133. The thickness t is the maximum thickness in the z-direction (perpendicular to the major plane of the lightguide which is parallel to the x-y plane) and may be in a range of 0.1 mm to 0.4 mm, for example. The first major surface 131 includes a plurality of extended features 110 extending in a first in-plane direction (y-direction) across at least 90 percent of an entire length L of a viewable area 130 of the lightguide. In the illustrated embodiment, the plurality of extended features 110 extends across the entire viewable area 130 which includes the entire first major surface. In other embodiments, the lightguide 100 may have regions near the perimeter of the lightguide which are not part of the viewable area 130 since these regions are not intended to output light through a display panel. In some embodiments, the plurality of extended features 110 may not extend entirely to the edges of the viewable area 130 in order to reduce effects from the edges, for example. In some embodiments, the length L of the viewable area is at least 90 percent of a length of the lightguide and the width W of the viewable area is at least 90 percent of a width of the lightguide.

In some embodiments, the length L is at least 100 times, or at least 200 times t. In some embodiments, the length L is no more than 10000 times t, or no more than 3000 times t. The extended features 110 may be lenticular lenses or prisms, for example. As is known in the art, lenticular features can be included on a surface of a lightguide to provide an improved angular output range in the cross direction (x-direction) and to improve cross-guide mixing. It has been found that for thin lightguides (e.g., L/t at least 100), that the extended features 110 do not need to cover the entire viewable area, but can include spaces which allow discrete light extraction features to be included in the spaces. In some embodiments, the extended features 110 cover at least 10, or at least 15, or at least 20 percent of the viewable area 130 and no more than 60, or no more than 55, or no more than 50 percent of the viewable area 130. For example, in some embodiments, the extended features 110 cover between 10 and 60 percent, or between 15 and 55 percent, or between 20 and 50 percent of the viewable area 130. Such ranges provide many or most of the optical benefits of the extended features 110 while leaving space for other features. In other embodiments, the extended features cover a larger percent (e.g., at least 80 percent or at least 90 percent) or substantially all, which can be understood to mean at least 95 percent, of the viewable area (see, e.g., FIGS. 2-3). A plurality of discrete features 120 is disposed in spaces between the extended features 110. In some embodiments, the discrete features 120 are light extraction features. The discrete features 120 are spaced apart along the length L and along a width W of the viewable area 130 of the lightguide 100.

In some embodiments, the plurality of extended features 110 and the plurality of discrete features 120 have a common base plane 105 and the discrete features 120 and the extended features 110 may each have a base contained in the common base plane 105. The discrete features 120 may have the shape of a portion of an ellipsoid or sphere, for example, or may have a plurality of distinct faces as described further elsewhere herein. In embodiments, where the discrete features have a plurality of distinct faces, the discrete features may be disposed over and overlapping with the extended features. The extended features may then cover at least 80 percent, or at least 90 percent of the viewable area, or may cover all (100 percent) of the viewable area.

The plurality of discrete features 120 includes discrete features 121, 123 and 127. Discrete feature 123 has a height h1, a width W1 and a length L1. Discrete feature 121 has a height h2. Discrete feature 127 has a width W2 and a length L2. In the illustrated embodiment, the each of the extended features 110 have a length L3, a width W3 and a height h3. In some embodiments, at least some of the discrete features (e.g., discrete feature 123) in the plurality of discrete features 120 have a height (e.g., h2) greater than or equal to a largest height (e.g., h3) of the plurality of extended features 110. In some embodiments, at least some of the discrete features in the plurality of discrete features 120 have a height less than or equal to a largest height of the plurality of extended features. In some embodiments, the plurality of extended features have a common height, and in some embodiments, the plurality of extended features comprise features having different heights. In some embodiments, a first discrete feature (e.g., discrete feature 123) in the plurality of discrete features 120 closer to the input edge 140 of the lightguide 100 has a smaller height, and/or a smaller width, than a second discrete feature (e.g., discrete feature 127) in the plurality of discrete features 120 farther from the input edge 140. This can be done to increase the relative extraction efficiency of the discrete features farther from the input edge so that the light output is more uniform. The density of the discrete features 120 may also vary along the first in-plane direction to improve the uniformity of light output. In some embodiments, each discrete feature in the plurality of discrete features 120 has a height in a range of 1 to 12 micrometers. In some embodiments, each extended feature in the plurality of extended features 110 has a height in a range of 10 to 20 micrometers.

In some embodiments, the length L3 of the extended features 110 is at least 500, or at least 800, or at least 1000 times the width W3 of the extended features. In some embodiments, the length L3 of the extended features 110 is at least 100, or at least 500, or at least 800 times the largest lateral dimension (e.g., L2) of the discrete features 120.

In some embodiments, each discrete feature, or each of at least a majority of the discrete features in the plurality of discrete features 120, in the plurality of discrete features 120 has a length along the first in-plane direction (y-direction) and a width along an orthogonal second in-plane direction (x-direction) where the length of the discrete feature is at least 1, or at least 1.1, or at least 1.3 times the width of the discrete feature. In some embodiments, the length of the discrete features is no more than 50, or no more than 10, or no more than 4 times, or no more than 3 times the width of the discrete feature. In some embodiments, each discrete feature in the plurality of discrete features 120, or each of at least a majority of the discrete features in the plurality of discrete features 120, has a length along the first in-plane direction and a width along an orthogonal second in-plane direction, where the length of the discrete feature is 1 to 50, or 1 to 20, or 1 to 10, or 1 to 4 times the width of the discrete feature. In other embodiments, at least some of the discrete features has a width larger than its length. For example, in some embodiments, the width is smaller than the length nearer the input edge 140 and the width is larger than the length farther from the input edge 140. In some embodiments, at least one discrete feature in the plurality of discrete features 120 has a length along the first in-plane direction and a width along an orthogonal second in-plane direction, the width of the discrete feature being 1 to 50 or 1 to 20, or 1 to 10, or 1 to 4 times the length of the discrete feature.

Lightguide 100 has an input edge 140, which extends between the first and second major surfaces 131 and 133. Light injected into input edge 140 propagates in the lightguide 100 primarily along the first in-plane direction (y-direction), though there will be some spread in the light in the x- and z-directions as well. The discrete features 120 may be light extraction features configured to extract light predominantly in the minus z-direction. In other embodiments, discrete features may be light extraction features configured to extract light predominantly in the plus z-direction. The lightguide 100 can be positioned in a display oriented with the structured surface facing towards or away from the light output direction of the display and a back reflector can be positioned behind the lightguide 100 to reflect any light extracted towards the back reflector back towards the light output direction.

Spatially related terms, including but not limited to, "top" and "back," are utilized for ease of description to describe spatial relationships of an element(s) to another. Such spatially related terms encompass different orientations of the article in use or operation in addition to the particular orientations depicted in the figures and described herein. For example, if an object depicted in the figures is turned over or flipped over, portions previously described as below or beneath other elements would then be above those other elements.

In the embodiment illustrated in FIG. 1B, a coating 150 is disposed on the second major surface 133. The coating 150 may be any type of coating suitable for a given application. For example, the coating 150 may be an impact resistant coating and may have a toughness and/or a fracture toughness higher than that of the material used in forming the body 101 of the lightguide 100. Suitable impact resistant coatings include those described in U.S. Pat. Appl. Pub. No. 2003/0157344 (Shoup et al.), for example. As another example, the coating 150 may be a hardcoat and may have a hardness higher than that of the material used in forming the body 101 of the lightguide. Any hardcoat conventionally used in optical films may be used. Suitable hardcoats include those described in U.S. Pat. App. Pub. No. 2013/0302594 (Sugiyama et al.), for example. In some embodiments, the coating may be both a hardcoat and an impact resistant coating. Other example coatings include, a low index layer, which may be a low index adhesive, or an anti-wetout coating. Such coatings can be used to prevent an interface with an adjacent layer from interfering with total internal reflection (TIR) from the second major surface 133.

An anti-wetout coating may include particles in a polymeric layer, as described, for example, in U.S. Pat. No. 6,268,961 (Nevitt et al.), where the particles provide a roughness which prevents the second major surface 133 from continuously contacting or wetting out an adjacent layer which could allow light to leak out of the lightguide to the adjacent layer.

A low index adhesive coating (an adhesive coating have a refractive index at 589 nm of no more than 1.45) can be used to attach the lightguide to an adjacent layer (e.g., a back reflector). This arrangement would allow TIR to occur at the second major surface 133 provided that the refractive index of the low index adhesive is sufficiently lower (e.g., at least 0.05 or at least 0.1 lower) than that of the material of the body 101 of the lightguide 100. Suitable low index adhesives include those available from Norland Products Inc. (Cranbury, N.J.), for example.

In some embodiments, a unitary polymeric film (corresponding to body 101) comprises the first and second major surfaces 131 and 133, the plurality of extended features 110 and the plurality of discrete features 120. In some embodiments, the second major surface 133 is unstructured and in some embodiments, the second major surface 133 is optically smooth.

Figure 2:
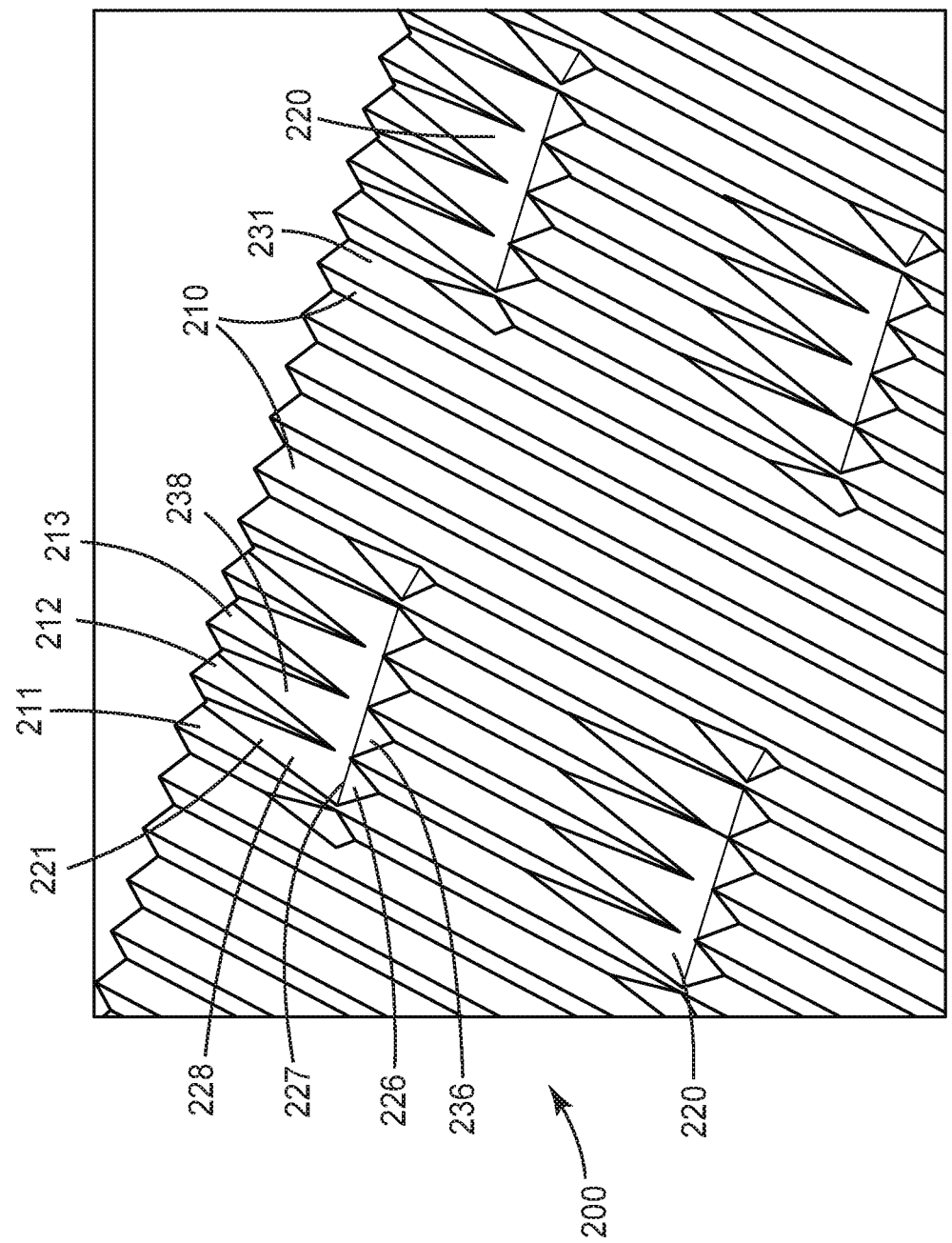
FIGS. 2-3 are perspective views of portions of lightguides.

FIG. 2 is a perspective view of a portion of a lightguide 200. Lightguide 200 has a first major surface 231 and an opposing second major surface. The first major surface 231 includes a plurality of extended features 210 extending in a first in-plane direction across at least 90 percent of an entire length of a viewable area of the lightguide 200. The length of the viewable area is at least 100 times the thickness of the lightguide. The first major surface 231 further includes a plurality of discrete features 220 spaced apart along the length and along a width of the viewable area of lightguide 200. The length, width and thickness of the viewable area of the lightguide 200 may be as described for lightguide 100. Each discrete feature in the plurality of discrete features 220 includes a first face 226 extending between and connecting adjacent first and second extended features 211 and 212 in the plurality of extended features 210; and a second face 228 adjacent the first face 226 and extending between and connecting the first and second extended features 211 and 212. In some embodiments, the first and second face 226 and 228 meet at an edge 227 of the discrete feature. In the illustrated embodiment, the discrete feature 221 further includes a third face 236 extending between and connecting the second extended feature 212 to an adjacent third extended feature 213; and a fourth face 238 adjacent the third face 236 and extending between and connecting the second and third extended features 212 and 213. Other discrete features in the illustrated embodiment, do not include such third and fourth faces. In the illustrated embodiment, the discrete feature 221 further includes additional faces extending between and connecting additional extended features. In some embodiments, a sufficient number of additional faces are included so that the width of the discrete feature is greater than the length of the discrete feature. In other embodiments, the length is larger than the width.

In the illustrated embodiment, the first and second faces 226 and 228 are triangular. It will be understood that triangular faces include faces which are nominally triangular but which deviate from a perfect triangle due to ordinary manufacturing variations, for example. In the illustrated embodiment, the extended features 210 have a triangular lateral cross-section. It will be understood that triangular cross-sections include cross-sections which are nominally triangular but which deviate from a perfect triangle due to ordinary manufacturing variations, for example.

In the embodiment illustrated in FIG. 2, the extended features 210 are linear prisms. In some embodiments, the apices of the prisms have an apex angle in the range of 85 to 115 degrees, or 90 to 110 degrees. In some embodiments, the apices of the prisms have a radius of curvature in the range of 0.01 to 20 micrometers, or from 0.1 to 15 micrometers. In some embodiments, the extended features 210 have a width from 10 to 40 micrometers, or from 15 to 30 micrometers, or from 15 to 20 micrometers. Increasing the radius of curvature of the prisms to be comparable with a width of the prisms, results in rounded extended features which may be described as lenticular lenses. In some embodiments, the extended features 210 are cylindrical or elliptical. In some embodiments, the extended features 210 entirely cover the viewable area of the lightguide 200.

Figure 3:
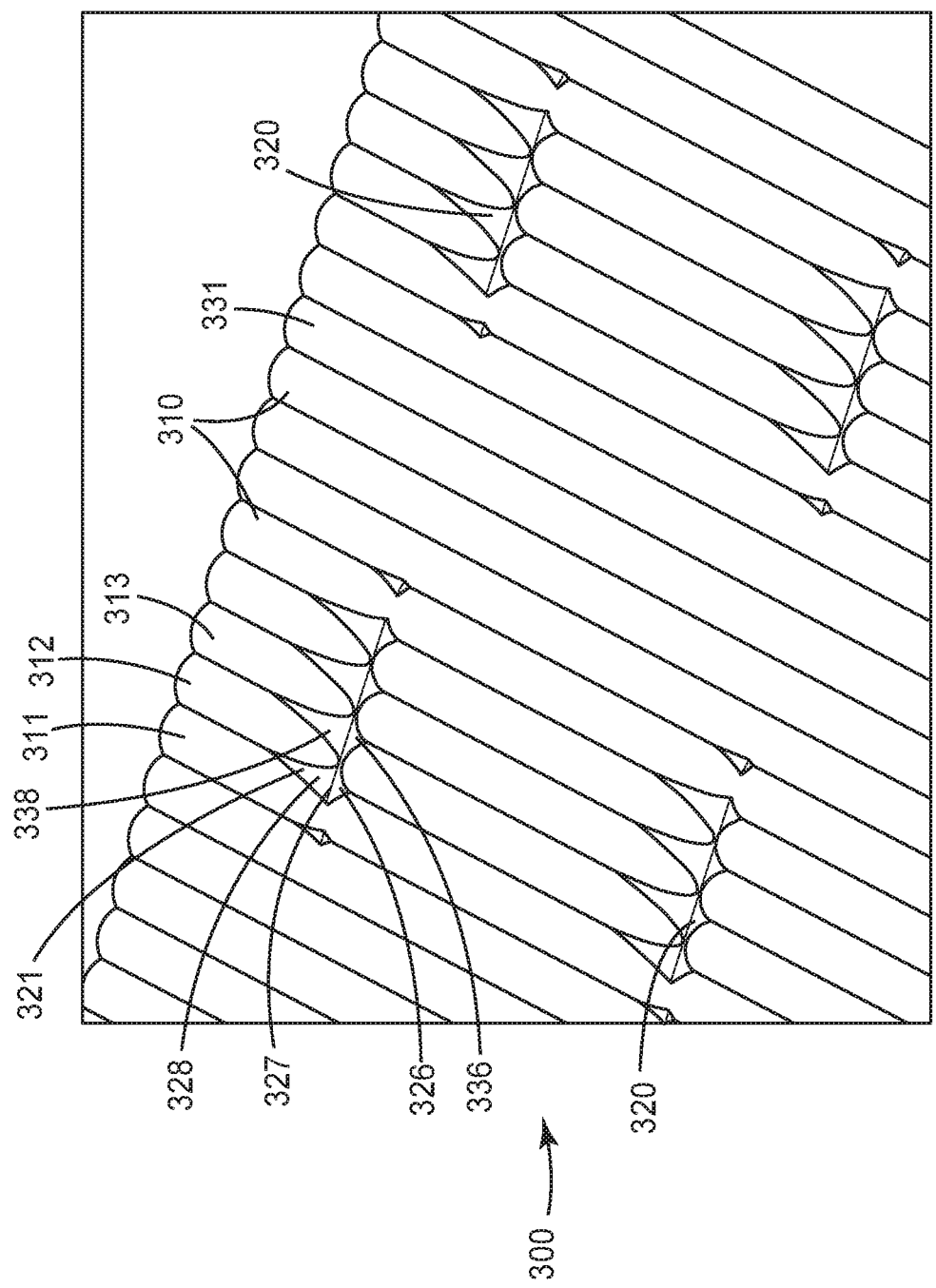

FIG. 3 is a perspective view of a portion of a lightguide 300. Lightguide 300 has a first major surface 331 and an opposing second major surface. The first major surface 331 includes a plurality of extended features 310 extending in a first in-plane direction across at least 90 percent of an entire length of a viewable area of the lightguide 300. The extended features 310 are cylindrical lenticular lenses in the embodiment illustrated in FIG. 4. The length of the viewable area is at least 100 times the thickness of the lightguide. The first major surface 331 further includes a plurality of discrete features 320 spaced apart along the length and along a width of the viewable area of lightguide 300. The length, width and thickness of the viewable area of the lightguide 200 may be as described for lightguide 100. Each discrete feature in the plurality of discrete features 320 includes a first face 326 extending between and connecting adjacent first and second extended features 311 and 312 in the plurality of extended features 310; and a second face 328 adjacent the first face 326 and extending between and connecting the first and second extended features 311 and 312. In some embodiments, the first and second face 326 and 328 meet at an edge 327 of the discrete feature. In the illustrated embodiment, the discrete feature 321 further includes a third face 336 extending between and connecting the second extended feature 312 to an adjacent third extended feature 313; and a fourth face 338 adjacent the third face 336 and extending between and connecting the second and third extended features 312 and 313. Other discrete features in the illustrated embodiment, do not include such third and fourth faces. In some embodiments, the extended features 310 entirely cover the viewable area of the lightguide 300.

Figure 4:
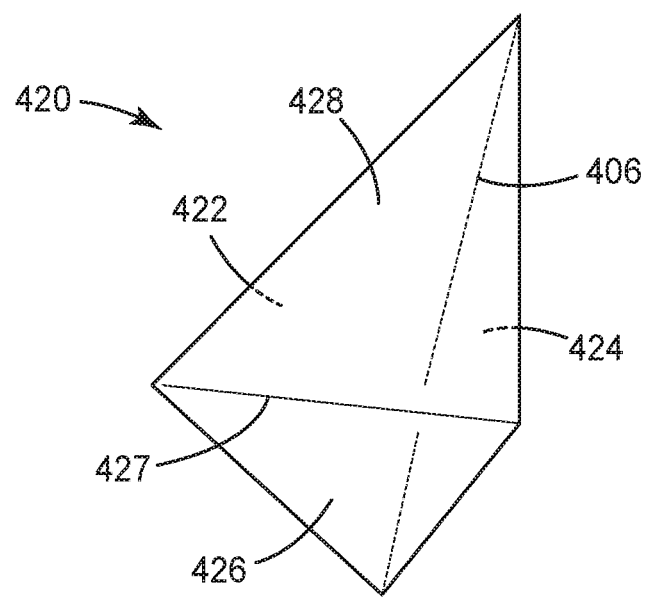
FIGS. 4-5 are schematic perspective views of discrete features.

FIG. 4 is a schematic perspective view of a discrete feature 420 including first and second faces 426 and 428 meeting at an edge 427. Discrete feature 420 has a base 406 which is a bottom edge of the discrete feature 420. The faces 422 and 424 may overlap with adjacent extended features as illustrated in FIG. 2.

Figure 5:
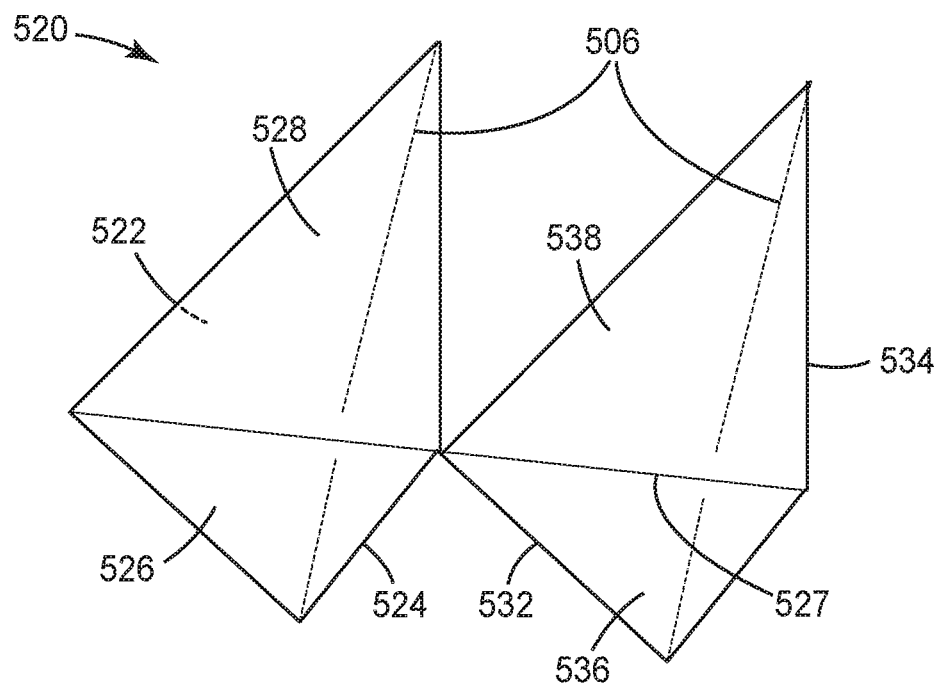
Figure 6:
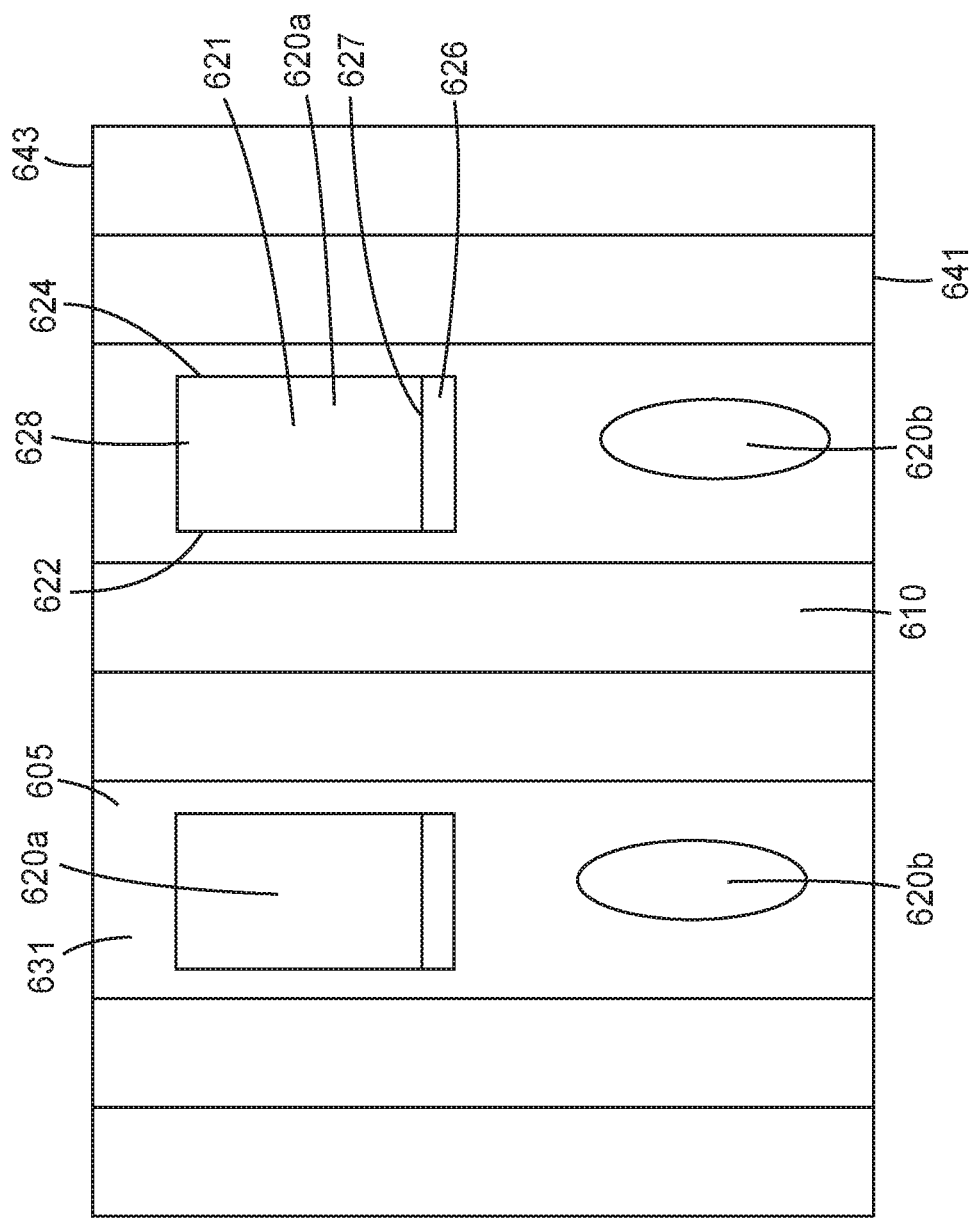
FIG. 6 is a schematic top view of a lightguide.

FIG. 5 is a schematic perspective view of a discrete feature 520 including first, second, third and fourth faces 526, 528, 536 and 538, respectively. The first and second faces 526 and 528, and the third and fourth faces 536 and 538 meet at a common edge 527 of the discrete feature 520 in the illustrated embodiment. Discrete feature 520 has a base 506 which includes the bottom edges of the discrete feature 520. The faces 522, 524, 532 and 534 may overlap with adjacent extended features as illustrated in FIG. 2.

The faces 422, 424, 522, 524, 532 or 534 may alternatively be curved as illustrated in FIG. 3.

Lightguide 600 includes first plurality of discrete features 620a and second plurality of discrete features 620b. Each feature in the first plurality of discrete features 620a includes a plurality of distinct faces and each feature in the second plurality of discrete features 620b is a portion of an ellipsoid. Such lightguides can alternatively be described as having a plurality of discrete features, some of which are portions of ellipsoids and some of which include a plurality of distinct faces. In other embodiments, the discrete features of the lightguide 600 each have a plurality of faces as illustrated for discrete feature 621, and in other embodiments, the discrete features of the lightguide 600 each have a shape of a portion of an ellipsoid as illustrated for discrete features 620b.

Lightguide 600 includes opposing edges 641 and 643, either or both of which could be a light input edge.

Discrete feature 621 includes first and second faces 626 and 628 which meet at an edge 627. Discrete feature 621 further includes a base which in the illustrated embodiment is a rectangular surface overlapping the base plane 605. In the illustrated embodiment, the first and second faces 626 and 628 are rectangular. It will be understood that rectangular faces include faces which are nominally rectangular but which deviate from a perfect rectangle due to ordinary manufacturing variations, for example.

Figure 7:
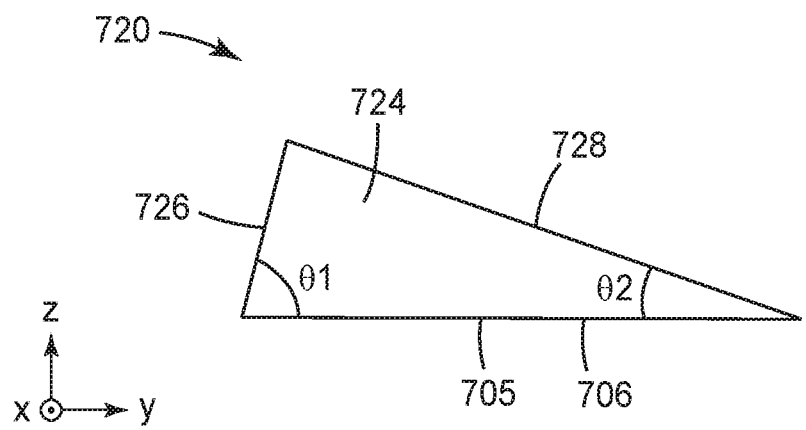
FIG. 7 is a schematic cross-sectional view along a length of a discrete feature.

FIG. 7 is a schematic cross-sectional view along a length of a discrete feature 720 which may correspond to discrete feature 420 or 621, for example. The discrete feature 720 includes first and second faces 726 and 728 which extend from a base plane 705 of adjacent extended features of a major surface of a lightguide. The discrete feature 720 includes a base 706 overlapping the base plane 705. Base 706 may be a bottom edge of the discrete feature 720 (corresponding to base 406, for example) or may be a bottom surface of the discrete feature 720 (corresponding to the base of discrete feature 621, for example). An angle between the first face 726 and the base 706 is θ1 and an angle between the second face 728 and the base 706 is θ2. In the illustrated embodiment, θ1 is also be the angle between the first face 726 and the base plane 705 of adjacent extended features of a lightguide including the discrete feature 720. Similarly, in the illustrated embodiments, θ2 is also be the angle between the second face 728 and the base plane 705 of adjacent extended features of a lightguide including the discrete feature 720. In some embodiments, θ1 is no less than 5 degrees, or no less than 10 degrees and is no more than 70 degrees or no more than 80 degrees. For example, in some embodiments, θ1 is between 10 and 70 degrees. In some embodiments, θ2 is no less than 1 degree, or no less than 2 degrees and is no more than 20 degrees, or no more than 15 degrees, or no more than 7 degrees. For example, in some embodiments, θ2 is between 1 and 20 degrees, or between 1 and 15 degrees, or between 1 and 7 degrees.

Figure 8:
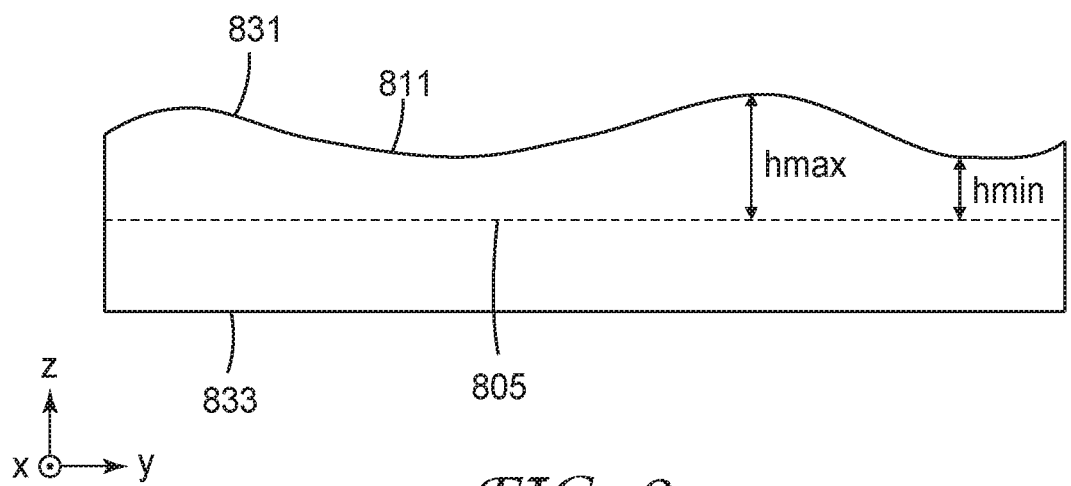
FIG. 8 is a schematic cross-sectional view along a length of an extended feature.

FIG. 8 is a schematic cross-sectional view along a length of an extended feature 811 of a lightguide having first and second major surfaces 831 and 833. The extended feature 811 extends from base plane 805 and has a height above the base plane 805 that varies between hmin and hmax. In some embodiments, the height of the extended features are substantially constant in the first direction (y-direction) so that hmin is approximately hmax. A substantially constant height refers herein to a height that varies from a mean height by no more than plus or minus 5%. In some embodiments, a substantially constant height varies from a mean height by no more than plus or minus 3%. In some embodiments, hmin is at least 0.5, or at least 0.7, or at least 0.9, or at least 0.95 times hmax. In some cases, hmin is less than hmax due to the method of making the extended features. For example, the lenticular lenses may be made using a tool that is cut in a single pass to make both the lenticular lenses and the extractors. In this case, the lenticular lenses may be formed by overlapping the same basic shape as the extractors and this results in segmented lenticular lenses having a varying height.

Figure 9:
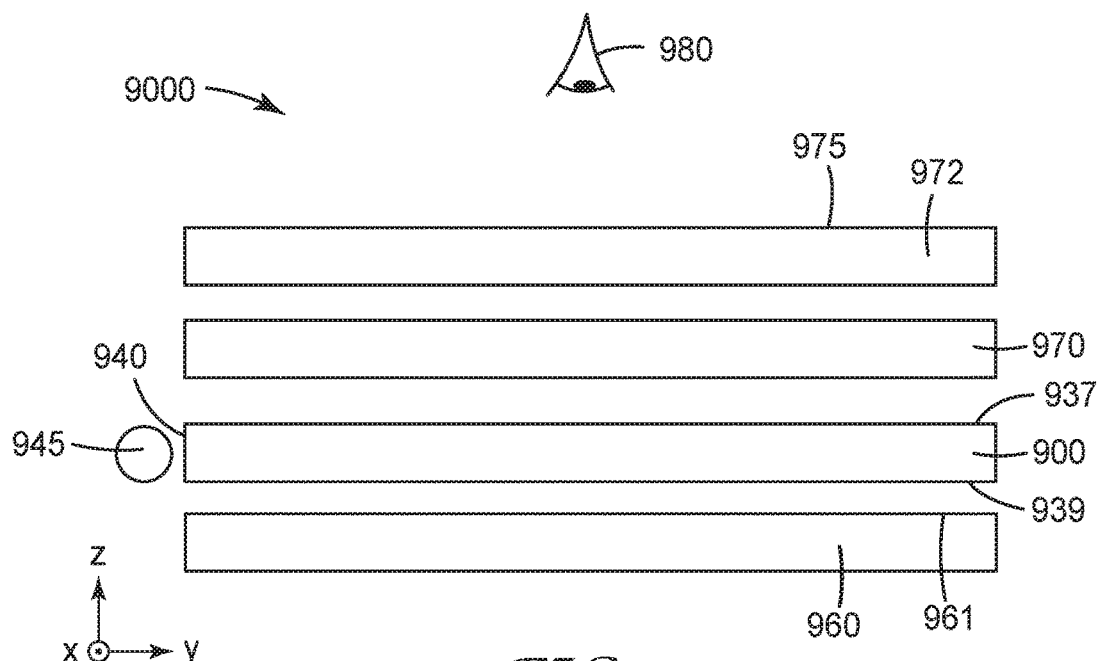
FIG. 9 is a schematic illustration of display.

FIG. 9 is a schematic illustration of display 9000 including a lightguide 900 having opposing major surfaces 937 and 939 and input edge 940; a light source 945 adjacent input edge 940; a back reflector 960; one or more layers 970; and a display panel 972 having an output surface 975 configured to face a viewer 980. In some embodiments, major surface 939 is the first major surface of the lightguide 900 that includes the extended features and the discrete features and major surface 937 is an unstructured second major surface of the lightguide 900. In other embodiments, major surface 937 is the first major surface of the lightguide 900 that includes the extended features and the discrete features and major surface 939 is an unstructured second major surface of the lightguide 900. In some embodiments, the back reflector 960 includes a coating 961 which may be an anti-wetout coating, for example. An anti-wetout coating may be applied to the back reflector 960 when the major surface 939 is unstructured, for example. Alternatively, or in addition, an anti-wetout coating may be applied to the major surface 939 when it is an unstructured surface, as described elsewhere herein. In some embodiments where major surface 939 is structured, the anti-wetout coating between the back reflector 960 and the lightguide 900 is omitted. In some embodiments, a coating, which may be an anti-wetout coating and/or a hardcoat and/or and impact resistant coating, is applied to major surface 937 to prevent wetout with the one or more layers 970 and/or to protect the lightguide 900 from potential damage from the one or more layers 970.

The lightguides 200, 300, 600 and 900 may have length scales (e.g., length, width, thickness) in the same ranges as described for lightguide 100. The extended features and discrete features of these lightguides may have a height and width as described for lightguide 100, for example.

The following is a list of exemplary embodiments of the present description.

Embodiment 1 is a lightguide having opposing first and second major surfaces and a thickness t between the first and second major surfaces, the first major surface including:
a plurality of extended features extending in a first in-plane direction across at least 90 percent of an entire length L of a viewable area of the lightguide, L being at least 100 times t, the extended features covering between 10 and 60 percent of the viewable area; and
a plurality of discrete features disposed in spaces between the extended features, the discrete features spaced apart along the length L and along a width W of the viewable area of the lightguide.

Embodiment 2 is the lightguide of Embodiment 1, wherein the extended features cover between 15 and 55 percent of the viewable area.

Embodiment 3 is the lightguide of Embodiment 1, wherein the extended features cover between 20 and 50 percent of the viewable area.

Embodiment 4 is the lightguide of Embodiment 1, wherein the plurality of extended features and the plurality of discrete features have a common base plane.

Embodiment 5 is the lightguide of Embodiment 1, wherein each discrete feature in the plurality of discrete features comprises a base, a first face extending from the base, and a second face extending from the base, the second face not parallel to the first face, the first and second faces meeting at an edge of the discrete feature, an angle between the second face and the base being between 1 and 20 degrees.

Embodiment 6 is the lightguide of Embodiment 5, wherein the angle between the second face and the base is between 1 and 15 degrees.

Embodiment 7 is the lightguide of Embodiment 5, wherein the angle between the second face and the base is between 1 and 7 degrees.

Embodiment 8 is the lightguide of Embodiment 5, wherein the first and second faces have a rectangular shape.

Embodiment 9 is the lightguide of Embodiment 1, wherein each discrete feature in the plurality of discrete features has a shape of a portion of an ellipsoid.

Embodiment 10 is the lightguide of Embodiment 9 further comprising a second plurality of discrete features disposed on the first major surface in spaces between the extended features, each discrete feature in the second plurality of discrete features comprising a base, a first face extending from the base, and a second face extending from the base, the second face not parallel to the first face, the first and second faces meeting at an edge of the discrete feature.

Embodiment 11 is the lightguide of Embodiment 1, wherein a unitary polymeric film comprises the first and second major surfaces, the plurality of extended features and the plurality of discrete features.

Embodiment 12 is the lightguide of Embodiment 1, wherein each discrete feature in the plurality of discrete features has a height in a range of 1 to 12 micrometers.

Embodiment 13 is the lightguide of Embodiment 1, wherein a first discrete feature in the plurality of discrete features closer to an input edge of the lightguide has a smaller height than a second discrete feature in the plurality of discrete features farther from the input edge.

Embodiment 14 is the lightguide of Embodiment 1, wherein each extended feature in the plurality of extended features has a height in a range of 10 to 20 micrometers.

Embodiment 15 is a lightguide having opposing first and second major surfaces and a thickness t between the first and second major surfaces, the first major surface including:
a plurality of extended features extending in a first in-plane direction across at least 90 percent of an entire length L of a viewable area of the lightguide, L being at least 100 times t, and
a plurality of discrete features spaced apart along the length L and along a width W of the viewable area of lightguide, each discrete feature in the plurality of discrete features comprising:
a first face extending between and connecting adjacent first and second extended features, and a second face adjacent the first face and extending between and connecting the first and second extended features, the first and second faces meeting at an edge of the discrete feature.

Embodiment 16 is the lightguide of Embodiment 15, wherein at least some of the discrete features in the plurality of discrete features have a height greater than or equal to a largest height of the plurality of extended features.

Embodiment 17 is the lightguide of Embodiment 15, wherein for at least some of the discrete features in the plurality of discrete features, the first face is closer to an input edge of the lightguide and the second face is farther from the input edge.

Embodiment 18 is the lightguide of Embodiment 15, wherein for at least some of the discrete features in the plurality of discrete features, the first face is farther from an input edge of the lightguide and the second face is closer to the input edge.

Embodiment 19 is the lightguide of Embodiment 15, wherein the plurality of extended features and the plurality of discrete features extend from a common base plane.

Embodiment 20 is the lightguide of Embodiment 15, wherein at least one feature in the plurality of extend features further comprises:
a third face extending between and connecting the second extended feature to an adjacent third extended feature; and
a fourth face adjacent the third face and extending between and connecting the second and third extended features.

Embodiment 21 is the lightguide of Embodiment 15, wherein an angle between the second face and a base plane of the first and second extended features is between 1 and 20 degrees.

Embodiment 22 is the lightguide of Embodiment 21, wherein the angle between the second face and the base plane is between 1 and 15 degrees.

Embodiment 23 is the lightguide of Embodiment 21, wherein the angle between the second face and the base plane is between 1 and 7 degrees.

Embodiment 24 is the lightguide of Embodiment 15, wherein an angle between the first face and a base plane of the first and second extended features is between 10 and 70 degrees.

Embodiment 25 is the lightguide of Embodiment 15, wherein each of the first and second faces are triangular.

Embodiment 26 is the lightguide of Embodiment 15, wherein the first and second faces meet at an edge of the discrete feature.

Embodiment 27 is the lightguide of Embodiment 15, wherein a unitary polymeric film comprises the first and second major surfaces, the plurality of extended features and the plurality of discrete features.

Embodiment 28 is a lightguide having opposing first and second major surfaces and a thickness t between the first and second major surfaces, the first major surface including:
a plurality of extended features extending in a first in-plane direction across at least 90 percent of an entire length L of a viewable area of the lightguide, L being at least 100 times t, and
a plurality of discrete features spaced apart along the length L and along a width W of the viewable area of lightguide, wherein a unitary polymeric film comprises the first and second major surfaces, the plurality of extended features, and the plurality of discrete features.

Embodiment 29 is the lightguide of Embodiment 28, wherein each discrete feature in the plurality of discrete features comprises:
a first face overlapping a portion of a major surface of a first extended feature in the plurality of extended features, and
a second face overlapping a portion of a major surface of a second extended feature in the plurality of extended features, the second extended feature adjacent the first extended feature.

Embodiment 30 is the lightguide of Embodiment 28, wherein each discrete feature in the plurality of discrete features is disposed in a space between adjacent extended features in the plurality of extended features.

Embodiment 31 is the lightguide of any one of Embodiments 1 to 30, wherein the plurality of extended features comprises a plurality of lenticular lenses.

Embodiment 32 is the lightguide of any one of Embodiments 1 to 30, wherein each feature in the plurality of extended features has a triangular lateral cross-section.

Embodiment 33 is the lightguide of Embodiment 32 further comprising a second plurality of extended features disposed on the first major surface and extending in the first in-plane direction, the second plurality of extended features comprising a plurality of lenticular lenses.

Embodiment 34 is the lightguide of any one of Embodiments 1 to 30, wherein each feature in the plurality of extended features has height that varies along the first in-plane direction.

Embodiment 35 is the lightguide of any one of Embodiments 1 to 30, wherein each feature in the plurality of extended features has height that is substantially constant along the first in-plane direction.

Embodiment 36 is the lightguide of any one of Embodiments 1 to 30, wherein L is in a range of 200 to 10000 times t.

Embodiment 37 is the lightguide of any one of Embodiments 1 to 30, wherein L is in a range of 200 to 3000 times t.

Embodiment 38 is the lightguide of any one of Embodiments 1 to 30, wherein each of at least a majority of the discrete features in the plurality of discrete features has a length along the first in-plane direction and a width along an orthogonal second in-plane direction, the length of the discrete feature being 1 to 50 times the width of the discrete feature.

Embodiment 39 is the lightguide of Embodiment 38, wherein the length of the discrete feature is from 1.1 to 35 times the width of the discrete feature.

Embodiment 40 is the lightguide of Embodiment 38, wherein the length of the discrete feature is from 1.1 to 10 times the width of the discrete feature.

Embodiment 41 is the lightguide of Embodiment 38, wherein the length of the discrete feature is from 1.1 to 3 times the width of the discrete feature.

Embodiment 42 is the lightguide of any one of Embodiments 38 to 41, wherein the length of the discrete feature is at least 1.3 times the width of the discrete feature.

Embodiment 43 is the lightguide of any one of Embodiments 1 to 30, wherein at least one discrete feature in the plurality of discrete features has a length along the first in-plane direction and a width along an orthogonal second in-plane direction, the width of the discrete feature being 1 to 50 times the length of the discrete feature.

Embodiment 44 is the lightguide of any one of Embodiments 1 to 30, wherein the discrete features are light extraction features.

Embodiment 45 is the lightguide of any one of Embodiments 1 to 30, wherein the extended features extend across the entire length of the viewable area of the lightguide.
Embodiment 46 is the lightguide of any one of Embodiments 1 to 30, wherein the length L of the viewable area is at least 90 percent of a length of the lightguide and the width W of the viewable area is at least 90 percent of a width of the lightguide.
Embodiment 47 is the lightguide of any one of Embodiments 1 to 30, wherein each extended feature in the plurality of extended features has a length along the first in-plane direction and a width along an orthogonal in-plane direction, the length of the extended feature being at least 800 times the width of the extended feature.
Embodiment 48 is the lightguide of any one of Embodiments 1 to 30 being unitary.
Embodiment 49 is the lightguide of any one of Embodiments 1 to 30 being a unitary polymeric film.
Embodiment 50 is the lightguide of any one of Embodiment 1 to 30, wherein the thickness t is in a range of 0.1 mm to 0.4 mm.
Embodiment 51 is the lightguide of any one of Embodiments 1 to 30, wherein the second major surface is unstructured.
Embodiment 52 is the lightguide of Embodiment 51, wherein the second major surface is optically smooth.
Embodiment 53 is the lightguide of any one of Embodiments 1 to 52 further comprising a coating disposed on the second major surface.
Embodiment 54 is the lightguide of Embodiment 53, wherein the coating is an impact resistant coating.
Embodiment 55 is the lightguide of Embodiment 53, wherein the coating is a hardcoat.
Embodiment 56 is the lightguide of Embodiment 53, wherein the coating is a low index adhesive.
Embodiment 57 is the lightguide of Embodiment 53, wherein the coating is an anti-wetout coating.
Embodiment 58 is a display comprising the lightguide of any one of Embodiment 1 to 57.
Embodiment 59 is the display of Embodiment 58 comprising an output surface configured to face a viewer, wherein the lightguide is disposed with the first major surface facing away from the output surface.
Embodiment 60 is the display of Embodiment 58 comprising an output surface configured to face a viewer, wherein the lightguide is disposed with the first major surface facing the output surface.
Embodiment 61 is the display of any one of Embodiments 58 to 60 further comprising one or more light sources disposed to inject light into an input edge of the lightguide primarily along the first in-plane direction.
Embodiment 62 is the display of any one of Embodiments 58 to 60 further comprising one or more optical films disposed on the second major surface.
Embodiment 63 is the display of any one of Embodiments 58 to 60 further comprising an anti-wetout coating disposed on the second major surface of the lightguide.
Embodiment 64 is the display of any one of Embodiments 59 to 60 further comprising a back reflector adjacent the lightguide opposite the output surface.
Embodiment 65 is the display of Embodiment 64, further comprising an anti-wetout coating on the back reflector.

EXAMPLES

Example 1

Lightguides having a length to width aspect ratio of 2:1 and a length to thickness ratio of 500:1 were modeled. One major surface of the lightguide was structured and the opposite major surface and the edges were optically smooth. The optically smooth major surface was the light output surface. The lightguide was modeled as polycarbonate. The viewable region of the lightguide was modeled as a rectangular region covering more than 95% of the front side (output side) of the lightguide. Efficiency was determined as the fractional power leaving the lightguide in the viewable area relative to the light originally emitted by the light source. To account for possible recycling, a back reflector was placed behind the lightguide and a frame was placed around the lightguide with the distance between the lightguide edge and the frame being 45% of the lightguide thickness. The frame was modeled as either black (zero percent reflectance) or white (85 percent reflectance). Uniformity was determined as the ratio of the minimum value to the maximum value of the illuminance distribution over an area that covered from ⅛th to ⅝th in each linear dimension of the viewable area. The light source was modeled as an array of light emitting diodes (LEDs) along an input edge of the lightguide which injected light primarily along the length direction of the lightguide. The LEDs were assumed to have a Lambertian output.

The efficiency was determined for various aspect ratios of elliptical extractors (dimension of the extractor along the length direction of the lightguide divided by the dimension of the extractor along the width direction of the lightguide) disposed on a surface in hexagonal pattern. There were no lenticular lenses included in this particular calculation. The efficiencies for lightguides with various extractor aspect ratios are show in the table below using a black (zero percent reflectance) frame:

| Extractor Aspect Ratio | Efficiency |
| --- | --- |
| 1 | 0.574 |
| 2 | 0.596 |
| 4 | 0.590 |

Next, lenticular lenses were added to the surface at a coverage area fraction ("Lenticular Duty Cycle") ranging from 0 to 0.66 (66 percent). The lenticular lenses had a circular cross-section and a height to base width aspect ratio of 0.2. The extractors were disposed between the lenticular lenses and had the shape of a portion of an ellipsoid having an out of plane axis and an axis in the direction of the length of the lightguide of 1.5 times an axis along the width of the lightguide. The efficiencies for lightguide with various lenticular duty cycles with a 0% reflectance frame and with an 85% reflectance frame are shown in the table below:

| | Efficiency | |
| --- | --- | --- |
| Lenticular Duty Cycle | 0% Reflectance Frame | 85% Reflectance Frame |
| 0.000 | 0.586 | 0.661 |
| 0.660 | 0.624 | 0.708 |
| 0.330 | 0.629 | 0.709 |
| 0.150 | 0.627 | 0.703 |

Figure 10:
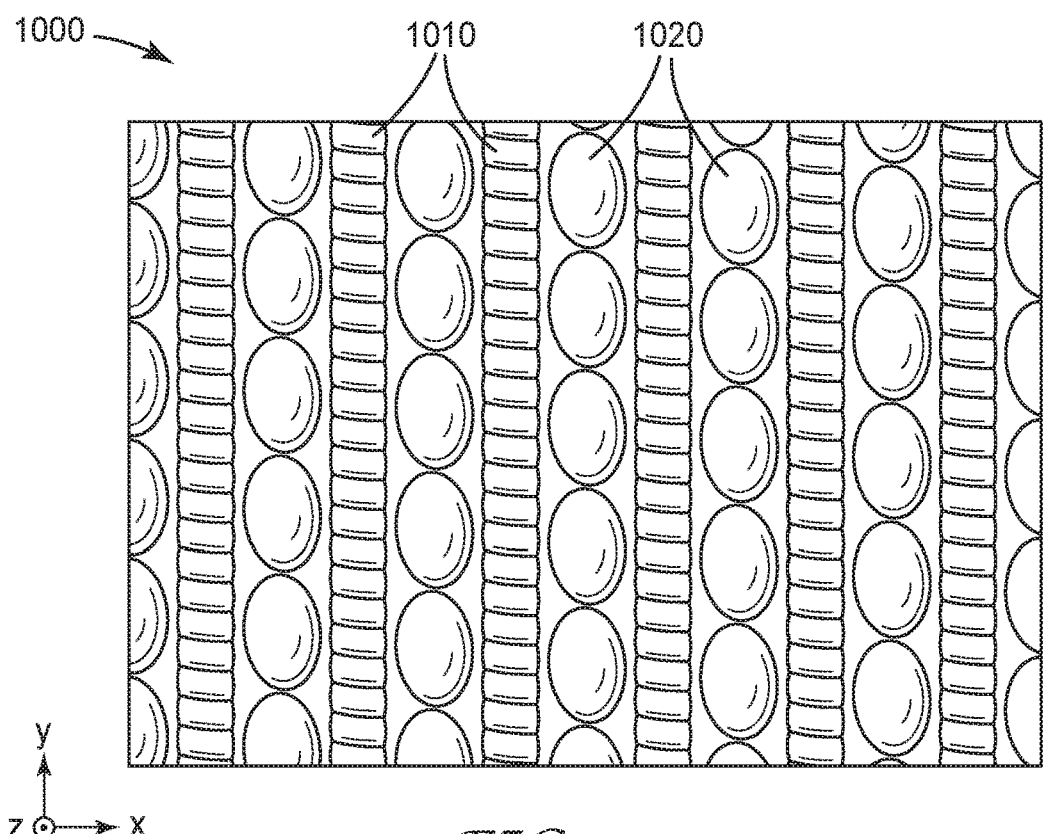
FIG. 10 is a top view of a portion of a lightguide.

Next, lightguides having extractors as described above but having segmented lenticular lenses were modeled. The segmented lenticular lenses were modeled as lenticular lenses that could be cut into a tool along with the extractors in a single pass. Accordingly, the segmented lenticular lenses were formed by overlapping the same basic shape as the extractors to form the lenticular lenses but at a different down-guide pitch characterized by a lenticular thread pitch multiplier. FIG. 10 illustrates a modeled lightguide 1000 with segmented lenticular lenses 1010 and extractors 1020. The segmented lenticular lenses 1010 have a lenticular thread pitch multiplier of 4. A larger lenticular thread pitch multiplier gives a smoother segmented lenticular lens but requires more passes to cut a tool for making the lightguide. The cross-section of the lenticular lenses has the shape of a portion of an ellipse having a major axis 1.5 times the minor axis with the major axis out-of-plane. The efficiency and uniformity using a 0% reflectance frame are reported in the table below:

| Lenticular Duty Cycle | Height to Base Width Aspect Ratio | Lenticular Thread Pitch Multiplier | Efficiency | Uniformity |
|---|---|---|---|---|
| 0.362 | 0.111 | 4 | 0.724 | 0.649 |
| 0.362 | 0.111 | 8 | 0.666 | 0.856 |
| 0.362 | 0.111 | 16 | 0.654 | 0.887 |
| 0.000 | NA | 16 | 0.591 | 0.983 |
| 0.182 | 0.055 | 16 | 0.612 | 0.976 |
| 0.257 | 0.078 | 16 | 0.631 | 0.943 |
| 0.362 | 0.111 | 16 | 0.654 | 0.887 |

Next, lightguides having extractors described above but having smooth lenticular lenses having the cross-sectional shape of a portion of an ellipse having a major axis 1.5 times the minor axis with the major axis out-of-plane were modeled. The efficiency and uniformity using a 0% reflectance frame are reported in the table below:

| Lenticular Duty Cycle | Height to Base Width Aspect Ratio | Efficiency | Uniformity |
|---|---|---|---|
| 0.182 | 0.055 | 0.607 | 0.977 |
| 0.257 | 0.078 | 0.620 | 0.963 |
| 0.362 | 0.111 | 0.639 | 0.919 |
| 0.500 | 0.156 | 0.640 | 0.871 |
| 0.514 | 0.039 | 0.612 | 0.971 |

Example 2

Lightguides having a length of 190 mm, a width of 70 mm and a thickness of 0.65 mm were modeled. One major surface of the lightguide was structured and the opposite major surface and the edges were optically smooth. The optically smooth major surface was the light output surface. The lightguide was modeled as polycarbonate. A back reflector was placed behind the lightguide and no frame was used. Lenticular lenses having a base width of 20 micrometers and a tip angle of 99.6 degrees with various radii of curvature at the tip were modeled. The lenticular lenses with a zero radius of curvature at the tip were prisms while the lenticular lenses using a 15 micrometer radius of curvature at the time were rounded lenses. Rectangular extractors similar to discrete features 620a were disposed between pairs of lenticular lenses. The cross-section through a length of the extractors had a geometry similar to that shown in FIG. 7 with θ1 equal to 45.8 degrees and θ2 equal to 4.8 degrees. The extractors were disposed on a square lattice with a pitch of 40 micrometers. The light output was determined as a function of polar and azimuthal angles theta and phi defined in the standard way for spherical coordinates relative to an x', y', z' coordinate system (i.e., theta is the angle between a radial vector and the z'-axis, and phi is the angle between the projection of the radial vector onto the x'-y' plane and the x'-axis) with the z'-axis parallel to the y-axis, the y'-axis parallel to the z-axis and the x'-axis parallel to the −x-axis and with the x-, y- and z-axes as shown in FIG. 1, for example. The light source was a plurality of LEDs modeled as having a Lambertian output and disposed at an edge of the lightguide to inject light primarily along the z' direction. The angles $theta_m$ and $phi_m$ of the light output where the output intensity was a maximum and the differences ±theta, ±phi between these angles and angles where the output intensity was half the maximum are reported in the table below:

| Radius of curvature at tip (μm) | Max. intensity angle $theta_m$ (degrees) | Half-max. intensity diff. angle +theta (degrees) | Half-max. intensity diff. angle −theta (degrees) | Max. intensity angle $phi_m$ (degrees) | Half-max. intensity diff. angle +phi (degrees) | Half-max. intensity diff angle −phi (degrees) |
|---|---|---|---|---|---|---|
| 0 | 69 | 12 | 7 | 90 | 30 | 32 |
| 5 | 69 | 12 | 8 | 90 | 29 | 29 |
| 10 | 69 | 13 | 8 | 98 | 22 | 40 |
| 15 | 71 | 11 | 10 | 87 | 32 | 28 |

For comparison, a lightguide without the lenticulars had $theta_m$=67 degrees, +theta=16 degrees, −theta=5 degrees, $phi_m$=9 degrees, +phi=32 degrees, and −phi=34 degrees.

Example 3

Lightguides were modeled as in Example 2, except that there lenticular lenses did not include spaces for the extractors, and the extractors appeared as in FIG. 2. The cross-section along the length of the extractors were as described for Example 2. The maximum length of the extractors was 109.9 micrometers. The angles $theta_m$ and $phi_m$ of the light output where the output intensity was a maximum and the differences ±theta, ±phi between these angles and angles where the output intensity was half the maximum (e.g., the output intensity was half the maximum at $theta_m$+(+theta) and at $theta_m$−(−theta)) are reported in the table below:

| Radius of curvature at tip (μm) | Max. intensity angle theta$_m$ (degrees) | Half-max. intensity diff. angle +theta (degrees) | Half-max. intensity diff. angle −theta (degrees) | Max. intensity angle phi$_m$ (degrees) | Half-max. intensity diff. angle +phi (degrees) | Half-max. intensity diff angle −phi (degrees) |
|---|---|---|---|---|---|---|
| 0 | 66 | 13 | 8 | 90 | 21 | 27 |
| 5 | 67 | 14 | 10 | 90 | 21 | 22 |
| 10 | 70 | 13 | 12 | 92 | 22 | 28 |
| 15 | 70 | 21 | 23 | 90 | 21 | 23 |

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A lightguide having opposing first and second major surfaces and a thickness t between the first and second major surfaces, the first major surface including:
   a plurality of extended features extending in a first in-plane direction across at least 90 percent of an entire length L of a viewable area of the lightguide, L being at least 100 times t, the extended features covering between 10 and 60 percent of the viewable area; and
   a plurality of discrete features disposed in spaces between the extended features, the discrete features spaced apart along the length L and along a width W of the viewable area of the lightguide.

2. The lightguide of claim 1, wherein the plurality of extended features and the plurality of discrete features have a common base plane.

3. The lightguide of claim 1, wherein each discrete feature in the plurality of discrete features comprises a base, a first face extending from the base, and a second face extending from the base, the second face not parallel to the first face, the first and second faces meeting at an edge of the discrete feature, an angle between the second face and the base being between 1 and 20 degrees.

4. The lightguide of claim 3, wherein the first and second faces have a rectangular shape.

5. The lightguide of claim 1, wherein each discrete feature in the plurality of discrete features has a shape of a portion of an ellipsoid.

6. The lightguide of claim 5 further comprising a second plurality of discrete features disposed on the first major surface in spaces between the extended features, each discrete feature in the second plurality of discrete features comprising a base, a first face extending from the base, and a second face extending from the base, the second face not parallel to the first face, the first and second faces meeting at an edge of the discrete feature.

7. The lightguide of claim 1, wherein a unitary polymeric film comprises the first and second major surfaces, the plurality of extended features and the plurality of discrete features.

8. The lightguide of claim 1, wherein a first discrete feature in the plurality of discrete features closer to an input edge of the lightguide has a smaller height than a second discrete feature in the plurality of discrete features farther from the input edge.

9. The lightguide of claim 1 further comprising a coating disposed on the second major surface.

10. The lightguide of claim 9, wherein the coating is an impact resistant coating.

11. A lightguide having opposing first and second major surfaces and a thickness t between the first and second major surfaces, the first major surface including:
    a plurality of extended features extending in a first in-plane direction across at least 90 percent of an entire length L of a viewable area of the lightguide, L being at least 100 times t, and
    a plurality of discrete features spaced apart along the length L and along a width W of the viewable area of the lightguide, each discrete feature in the plurality of discrete features comprising:
       a first face extending between and connecting adjacent first and second extended features, and
       a second face adjacent the first face and extending between and connecting the first and second extended features, the first and second faces meeting at an edge of the discrete feature.

12. The lightguide of claim 11, wherein at least some of the discrete features in the plurality of discrete features have a height greater than or equal to a largest height of the plurality of extended features.

13. The lightguide of claim 11, wherein for at least some of the discrete features in the plurality of discrete features, the first face is closer to an input edge of the lightguide and the second face is farther from the input edge.

14. The lightguide of claim 11, wherein for at least some of the discrete features in the plurality of discrete features, the first face is farther from an input edge of the lightguide and the second face is closer to the input edge.

15. The lightguide of claim 11, wherein the plurality of extended features and the plurality of discrete features extend from a common base plane.

16. The lightguide of claim 11, wherein at least one feature in the plurality of extend features further comprises:
    a third face extending between and connecting the second extended feature to an adjacent third extended feature; and
    a fourth face adjacent the third face and extending between and connecting the second and third extended features.

17. The lightguide of claim 11, wherein a unitary polymeric film comprises the first and second major surfaces, the plurality of extended features and the plurality of discrete features.

18. A lightguide having opposing first and second major surfaces and a thickness t between the first and second major surfaces, the first major surface including:

a plurality of extended features extending in a first in-plane direction across at least 90 percent of an entire length L of a viewable area of the lightguide, L being at least 100 times t, and a plurality of discrete features spaced apart along the length L and along a width W of the viewable area of the lightguide, wherein a unitary polymeric film comprises the first and second major surfaces, the plurality of extended features, and the plurality of discrete features.

19. The lightguide of claim 18, wherein each discrete feature in the plurality of discrete features comprises:

a first face overlapping a portion of a major surface of a first extended feature in the plurality of extended features, and a second face overlapping a portion of a major surface of a second extended feature in the plurality of extended features, the second extended feature adjacent the first extended feature.

20. The lightguide of claim 18, wherein each discrete feature in the plurality of discrete features is disposed in a space between adjacent extended features in the plurality of extended features.

\* \* \* \* \*

UNITED STATES PATENT AND TRADEMARK OFFICE
CERTIFICATE OF CORRECTION

PATENT NO. : 10,775,547 B2  
APPLICATION NO. : 16/497012  
DATED : September 15, 2020  
INVENTOR(S) : Robert Emmons Page 1 of 1

It is certified that error appears in the above-identified patent and that said Letters Patent is hereby corrected as shown below:

On the Title Page

Column 1 (Assignee)
Line 1, Delete "Innovation" and insert -- Innovative --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*